United States Patent [19]

Fradin et al.

[11] Patent Number: 4,614,120

[45] Date of Patent: Sep. 30, 1986

[54] DETERMINATION OF THE MAKE-UP TORQUE FOR PIPE JOINTS

[75] Inventors: Louis Fradin; Bernard Plaquin; Hervé Salkin, all of Aulnoy, France

[73] Assignee: Vallourec, Paris, France

[21] Appl. No.: 699,541

[22] Filed: Feb. 8, 1985

[30] Foreign Application Priority Data

Feb. 10, 1984 [FR] France .................. 84 02063

[51] Int. Cl.$^4$ .................. B23Q 17/00; G01L 5/24
[52] U.S. Cl. .................. 73/761; 29/407; 116/212; 285/93
[58] Field of Search .............. 73/761, 862.21, 862.23, 73/862.24; 116/212; 29/407; 285/93

[56] References Cited

U.S. PATENT DOCUMENTS

| | | | |
|---|---|---|---|
| 3,468,563 | 9/1969 | Duret | 285/93 |
| 3,851,386 | 12/1974 | Ellzey, Jr. | 29/407 |
| 4,054,305 | 10/1977 | Gauauiva et al. | 285/93 X |
| 4,127,927 | 12/1978 | Hauk et al. | 29/407 |

Primary Examiner—Charles A. Ruehl
Attorney, Agent, or Firm—Arnold, White & Durkee

[57] ABSTRACT

The invention provides a process for the determination of the make-up torque to be applied on a joint for pipe, destined to the petroleum industry according to which a reference mark is set on the male element and on the female element, so that when the two reference marks are brought to face each other, the make-up restriction stops (2) on the male element (1) and on the female element come into contact with each other; that after having applied a grease, we proceed to make-up by applying sufficient torque to cause one element to rotate with respect to the other one, at a predetermined angle beyond the point where the reference marks are facing each other, and we proceed to measure the torque; that this operation is repeated on a sufficient number of joints; and that a determination is made of the range of torques to be applied on the joints of this type with the grease that has been used.

10 Claims, 4 Drawing Figures

DETERMINATION OF THE MAKE-UP TORQUE FOR PIPE JOINTS

BACKGROUND OF THE INVENTION

The present invention is related to a new process for the determination of the make-up torque that must be applied to the tightening of a joint for steel pipes, having tapered threads and/or hooped surfaces and at least one make-up restriction stop. Such joints are utilized in the petroleum industry, especially to drop casing strings or pipe for the extraction of petroleum or gas.

SUMMARY OF THE INVENTION

The present invention also concerns devices for the implementation of this process.

In the petroleum industry joints are commonly used for steel pipe having truncated threads and at least one make-up restriction stop which is usually located inside the female element beyond the threading. When making up the joint, the end of the male element comes to rest on the stop.

Since the threads and/or other surfaces of the male element and of the female element are usually hooped, that is to say, that in order that the end of the male element may come into contact with the make-up restriction stop on the female element, it is necessary that radial stress be applied at the level of the threading and/or other hooped surfaces which tend to reduce the threading diameter of the male element and to increase the threading diameter of the female element, in practice, it is not possible, when making up a given male element into a given female element, to easily determine the moment from which the male element end comes into contact with the make-up restriction stop on the female element.

Furthermore, various factors are involved in the determination of the necessary torque to be applied on the joint to bring into contact the make-up restriction stops.

Certain problematic factors are represented by the machining tolerances concerning, on the one hand the threading diameter of the male element and of the female element, and on the other hand the axial positions of the stops with respect to these threadings.

However, although problematic, for a given family of joints these factors vary between limits which are relatively well determined.

The make-up torque, permitting the coming into contact of the make-up restriction stops, also depends on factors which are relatively stable, such as for instance, the mechanical characteristics of the grease utilized to be applied on the threads and on the stops before the make-up of the joint.

Now, it is known that the characteristics of the grease utilized has a decisive influence on the make-up torque that must be applied on the joint in order to obtain an optimum make-up.

According to the present state of the technology, for each type of joint, the manufacturer provides a range of optimum make-up torques, which are determined by utilizing a reference grease.

This involves the verification of the grease utilized at the work site to see if it presents the same characteristics as those of the reference grease, or through the utilization of translation tables or measurements difficult to be taken at the work site, the determination of the difference existing between the reference grease and the grease actually utilized.

All these measurements and determinations are time consuming and complicated and may often involve errors the effects of which could be significant.

It is in fact of the utmost importance to have the threaded joints in good condition, particularly in the case of steel pipe subjected to considerable axial stresses, that whatever may be the conditions of utilization of the joint, the make-up restriction stops be placed one on the other with sufficient axial forces, otherwise, the operating conditions of the joint will quickly deteriorate.

However, it is equally important, when making up, not to apply such forces on the make-up restriction surfaces as to damage these stops which thus would be rendered unusable.

Therefore, for the proper operation of the joint, it is necesssary to apply on a joint of a given type, a final make-up torque within a well deterined range.

Now, in some cases, the range may be limited, in particular in the case of a joint of the coupling type, in which two male elements (whose stops and threads are machined only in the normal thickness of the pipe) are connected by the coupling which constitutes a double female element.

The present invention permits to simply and quickly determine on the work site, the range of torques with which joints of a particular type must be made up by utilizing a particular type of grease which is not necsessarily the reference grease.

The present invention deals with a process for the determination of the range of make-up torques to be applied on a joint for steel pipe destined to the petroleum industry, a joint consisting of a male element and a female element with truncated threadings and/or hooped surfaces, and at least one couple of make-up restriction stops subjected to axial stresses when making up, characterized by the fact that on the periphery of the male element and on the periphery of the female element a reference point is determined in such positions that when the two reference marks are brought to face each other, the stops of the male element and of the female element restricting the make-up come into each other's contact for the first time; that, after having applied grease on the threads and on the stops, the joint is then made up by applying to the joint a torque sufficient to have it rotate, in the same direction as the make-up rotation, but beyond the point where the reference marks are facing each other, one element with respect to the other at a predetermined angle depending on the nature of the joint, and that the torque necessary to obtain such make-up is measured; and that this operation is repeated on a sufficient number of male elements and female elements of the same type to take into consideration the dimensional variations due to the manufacturer's tolerances; and that the range of make-up torques to be applied to joints of this type with the grease that has been utilized is determined.

According to the invention, the reference points and the male element and the female element are found by determining the generatrix according to which a given thread is at a given axial distance from the make-up restriction stop on the male element on one hand, and on the female element on the other hand, eventually taking into account the stretching of the male element and the shortening of the female element which may occur during the make-up operation, due to the hooping between the male thread and the female thread which is between all other hooped surfaces.

In this manner we find that when the two reference points of the male element and of the female element are positioned facing each other, the two make-up restriction surfaces have just come into contact with each other.

In a general manner, the hooping requiring the application of a certain torque for the make-up restriction stops to come into contact with each other, is mainly obtained at the level of the threadings. However, this torque may also result from the existence of tightness hooped surfaces, which are applied one on the other with sufficient force to insure tightness.

The invention also applies to joints with straight threads, that is, non hooped ones, but having other hooped surfaces, such as tightness surfaces.

The present invention also deals with a device characterized by the fact that it consists of two reference marking gauges, each of them including a stop corresponding to the make-up restriction stop of the male element or of the female element, with at least one thread corresponding to the threading of the corresponding element and a means such as a slot in order to permit the marking of a reference point on the element on which the gauge is inserted, the distance between the point of the thread facing the reference mark and the stop being the same on the male gauge as on the female gauge.

In a particular method of implementation of the invention male and female gauges of an overall cylindrical shape may be utilized, which include surfaces corresponding only to the threaded surfaces and to the make-up restriction stops on the male element and on the female element of the joint, the reference mark of the male gauge being aligned with the reference mark of the female gauge when, after making up, the make-up restriction surfaces of the two gauges come into contact with each other.

To perform the marking of the reference points on the elements of the joint, according to the invention, it is sufficient only to make up the corresponding gauge on the male and female elements which must be joined together in order to be able to mark the reference points.

In a particular method of implementation, the gauges, according to the invention consist only of small bars, that is to say, of a slight circumferential part of the full cylindrical gauge.

Thusly, the gauges which may be of a relatively small thickness, such as a few centimeters, are easily inserted into the threading of the male element or of the female element, whether the gauge is male or female, and by moving these small bars along the threading until the gauge stop comes to rest on the make-up restriction stop of the joint, the position of the reference point on the joint element may be determined.

In a particularly simple method of implementation, the gauge includes an elongated slot, the direction of which corresponds to that the generatrices of the pipe, a marking device is then inserted through this slot to make the reference mark on the element of the joint.

For a better understanding of the invention, we are now going to describe as an illustration and without any limitation value, a method of implementation chosen as an example as per the attached drawing.

On this drawing,

FIG. 1 is a sectional view of a main element on which a female gauge is placed in the position corresponding to the reference mark on the male element, FIG. 2 is a view from underneath corresponding to FIG. 1, FIG. 3 is a sectional view of the female element of the joint destined to be assembled with the male element of FIG. 1, a male gauge being placed on the female element in the position corresponding to the reference mark traced.

Figure 2:
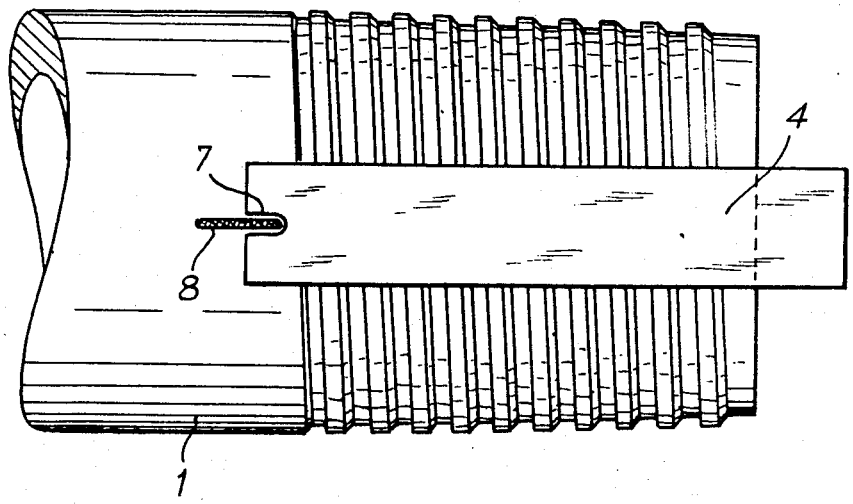

In the position represented on the drawing we have turned manually the gauge (4) in the direction of the make-up, so that it exerts a very light radial compression stress assuring the contact of stops (2) and (5). As can be seen in FIG. 2, gauge (4) is only a few centimeters wide which permits easy handling.

In the method of implementation shown, gauge (4) has a long notch (7) that permits tracing the reference mark (8) on a non machined part of the male element (1). This reference mark (8) may be made by slightly engraving it with a netching needle, the markings could also be made with paint or with some other kind of dye.

It may be noted, that according to the invention, the female gauge is only inserted over the male element by its stop corresponding to the make-up restriction stop (5), and by a section of threading (6), gauge (4) must not contact the male element (1) at the level of other surfaces, such as for example the tightness surfaces.

Figure 1:
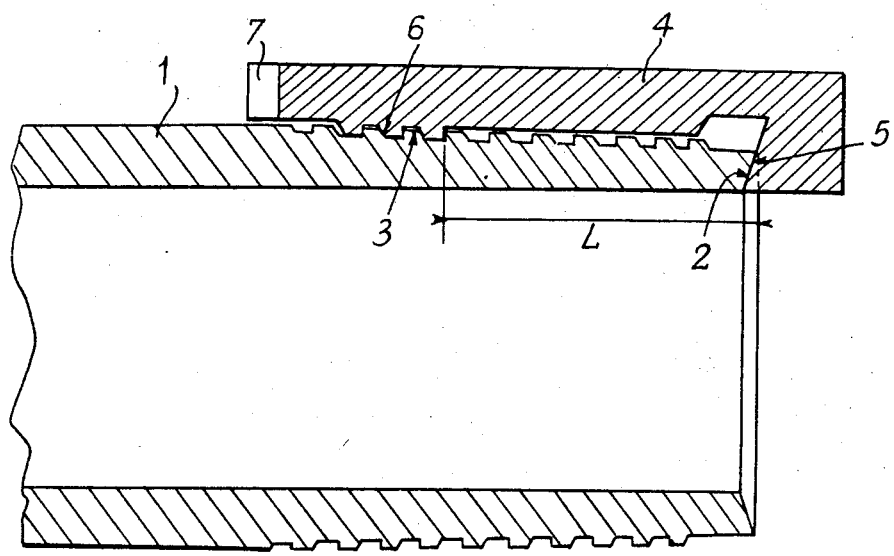
FIG. 1 shows the end of the male element (1), which has a make-up restriction stop (2), and a truncated threading (3). a female gauge (4) which includes a stop (5) corresponding to the make-up restriction stop of the female element, as well as part of the threading (6) (in the present example 3 threads) which is placed at the end of the male element.

FIG. 1 also shows the distance of reference mark (L) between a reference thread and the end of the male element at a point corresponding to the reference mark.

Figure 3:
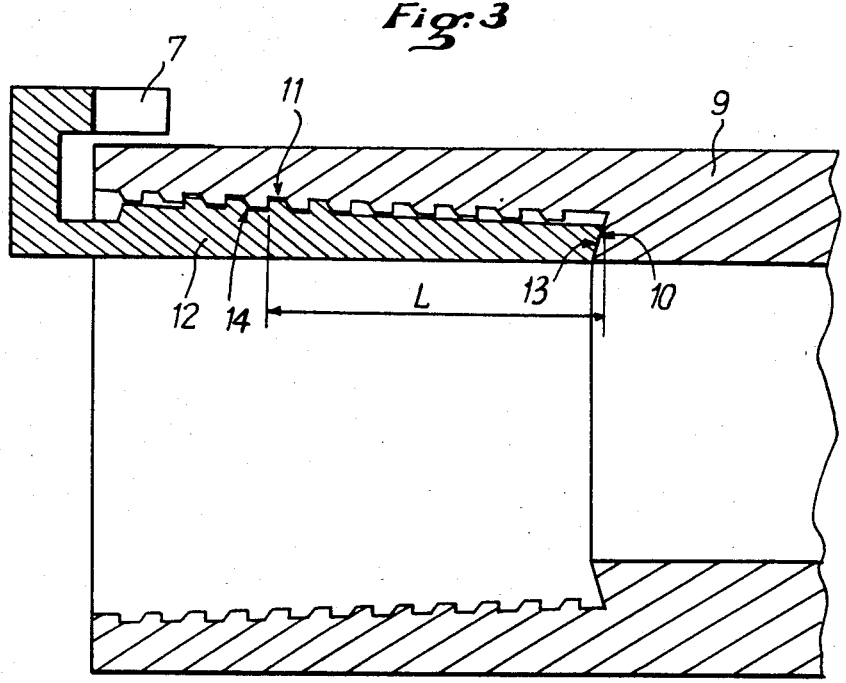
Figure 4:
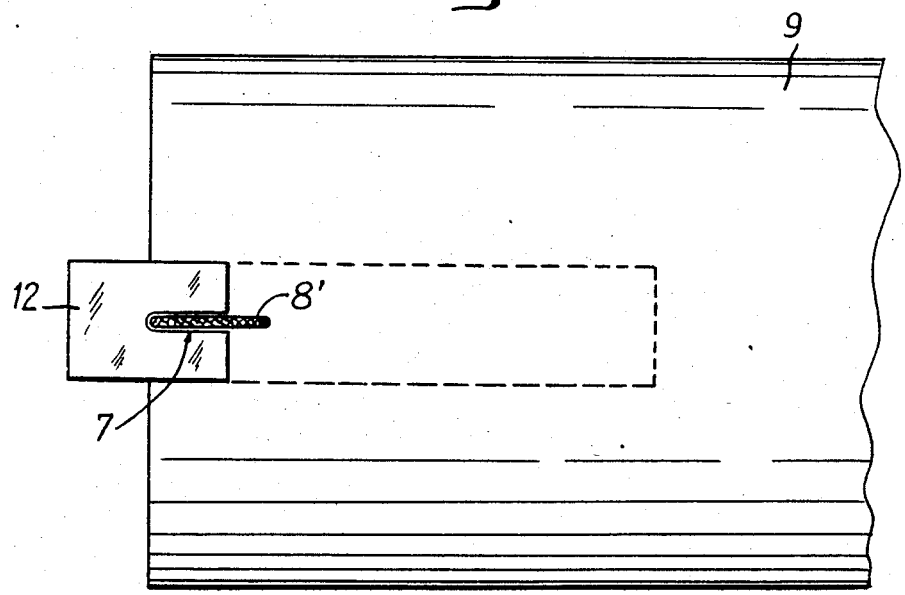
FIG. 4 represents a top view corresponding to FIG. 3.

FIG. 3 shows a section of the female element (9) with a make-up restriction stop (10) and a truncated threading (11) corresponding to threading (3) of the male element.

The male gauge (12) has been placed on the female element which includes a stop (13) and threading elements (14) that in the present case are reduced to three threads. The male gauge (12) is turned manually on the female element until stops (10) and (13) come into contact with each other, which permits assuring that the gauge is positioned on the generatrix of the female element for which the distance (L) between the reference thread and the make-up restriction stop (10) is equal to the corresponding distance on the male element.

The male gauge has a long opening (7) like the female gauge in FIG. 1, which permits the setting of a (8') reference mark on the periphery of the female element.

We can see in this manner that, according to the invention, it is possible to easily and quickly make two reference marks (8) and (8') on a couple of male element and female element which must be tightened together, with said reference marks being such that when they are matched in make-up, the stop at the end of the male element comes exactly into contact with the make-up restriction stop (10) of the female element.

If due to the hooping occurring at the level of the male and female threadings and all other hooped surfaces, during make up of a joint, a stretching of the male element occurs (due to its diametral contraction) as well as a shortening of the female element (due to its diametral enlargement), it is advantageous, according to the invention, to take into account these variations of length of the two elements, by shifting at an appropriate angle, the position of one or both reference marks (8) and (8'), so that when making up the joint, the surfaces of both stops come into contact with each other when the two reference marks (8) and (8') coincide.

For the implementation of the process according to the invention, first we select at random a sufficient number of couples of male and female elements with the same characteristics, and we make a reference mark on each of the elements of the joint, as indicated above.

The grease that must be used for the making up of the joints is applied over the threadings and the make-up restriction stops, and measurements are made, for each of the joints, of the make-up torque to be applied on them so that beyond their alignment position reference marks (8) and (8') be off-set in a predetermined rotation angle depending on the axial stress desired to be applied on the make-up restriction stops.

In practice, this off-setting is generally done between 5 and 15 degrees.

The torques measured on each of the joints tested are transferred on a chart which has the general shape of a Gauss curve and permits to easily determine the minimum and maximum values of the make-up torque to be utilized on the joint, taking into account the machining tolerances and the nature of the grease used.

It is usually sufficient to measure the torque on ten to twenty points to obtain the range of make up torques to be applied, with a fair accuracy.

It shall be understood that the method of implementation of the invention as just described, is not of any limiting nature, and that any desired modifications may be introduced to it, without departing from the framework of the invention.

In particular, if the utilization of gauges in the form of small bars is particularly advantageous, it is also possible to utilize cylindrical gauges, such as those which are usually used in the tubular goods industry.

Finally, it goes without saying that the invention is not limited to joints with only one couple of make-up restriction stops, it being understood that the positioning of the reference marks on the elements of the joints would be determined in relation to the make-up restriction stops coming first in contact in the case that there would be several couples of make-up restriction stops.

What is claimed is:

1. Process for the determination of the range of make-up torques to be applied on a joint for steel pipe, destined to the petroleum industry, joint consisting of a male element (1) and a female element (9) with truncated hooped threadings (3, 11) and/or hooped surfaces and at least a couple of make-up restriction stops (2, 10) placed under axial stresses when making-up, characterized by the fact that on the periphery of the male element and on the periphery of the female element a reference mark (8) is determined, the positions of which are such that when the two reference marks (8) are brought to face each other, the make-up restriction stops (2, 10) of the male element (1) and of the female element (9) come into contact with each other for the first time; that after having applied grease on the threadings and on the stops, we proceed to make up the joint by applying a sufficient torque to make rotate in the make-up direction, one element with respect to the other one, at a predetermined angle depending on the nature of the joint, beyond the point where the reference marks are facing each other, and that the torque necessary to achieve such make-up is measured; that this operation is repeated on a sufficient number of male elements and female elements of the same type to take into consideration the dimensional variations due to manufacturing tolerances; and that a determination is made of the range of make-up torques which must be applied to joints of this type with the grease that has been used.

2. Process according to claim 1, characterized by the fact that the references marks are set on the male element and on the female element by determining on each one of these elements the generatrix for which a given thread is found at a given axial distance from the make-up restriction stop of the considered element.

3. Process according to claim 2, characterized by the fact that in the case of tapered threads, due to hooping on the threadings, the stretching of the male element and the shortening of the female element are taken into consideration and all other hooped surfaces.

4. Process according to claim 1, characterized by the fact that the predetermined angle beyond which the joint is tightened beyond the point where the reference marks are facing each other, is ranging between 5 and 15 degrees.

5. Device usable for determining the range of make-up torques to be applied to a joint between threaded male and female elements, characterized by the fact that it comprises a pair of male and female reference marking gauges (4, 12) each one of them including a stop (5, 13), corresponding to a make-up restriction stop (2, 10) of the male element or the female element, at least one thread (6, 14) corresponding to the threading of the corresponding element and a slot (7) permitting the setting of a reference mark (8, 8') on the element on which the gauge is inserted, wherein the distance (L) between the point of the thread located facing the reference mark and the stop is the same on the male gauge as on the female gauge.

6. Device according to claim 5, wherein the male and female marking gauges each comprise a generally cylindrical shape with both having surfaces corresponding only to the threaded surfaces (3, 11) and to the make-up restriction stops (2, 10) of the male element and of the female element of the joint, the reference slot (7) of the male gauge being aligned with the reference slot (7) of the female gauge when the make-up restriction surfaces of the two gauges come into contact with each other when the gauges are joined together.

7. Device according to claim 5, characterized by the fact that each gauge has the shape of a small bar consisting of a longitudinal section of a cylindrical gauge.

8. Device according to claim 5, characterized by the fact that the angular position of the reference slots (7) on the gauges (4, 12) takes into account the stretching of the male element and the shortening of the female element which are due to the hooping in the threadings which is due to the different zones of the hooping in the joint.

9. A method of making up pipe joints of the type that introduce radial hoop stresses on the male and female elements upon make up and include stops on the male and female elements which introduce axial stresses upon make up, which comprises gauging the male and female elements to ascertain the position of each element when the stops first come into contact, marking said position on each the male and female elements so that said markings are aligned when the stops first come into contact, applying grease to said male and female elements, and making up said male and female elements by torquing said elements beyond the point where said markings align by a pre-determined radial angle ascertained by calibrated statistical measurement of the plurality of similar male and female elements.

10. The method of claim 9 wherein said radial angle ranges between 5 and 15 degrees.

* * * * *